US011193264B2

United States Patent
Salemi Parizi et al.

(10) Patent No.: US 11,193,264 B2
(45) Date of Patent: *Dec. 7, 2021

(54) TOILET OVERFLOW PREVENTION SYSTEM AND METHOD

(71) Applicant: LIMIT, INC., Irvine, CA (US)

(72) Inventors: Farshid Salemi Parizi, Seattle, WA (US); Josh Fromm, Seattle, WA (US)

(73) Assignee: Limit, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/877,125

(22) Filed: May 18, 2020

(65) Prior Publication Data

US 2020/0277772 A1 Sep. 3, 2020

Related U.S. Application Data

(63) Continuation of application No. 16/017,869, filed on Jun. 25, 2019, now Pat. No. 10,697,166.

(60) Provisional application No. 62/688,252, filed on Jun. 21, 2018, provisional application No. 62/525,645, filed on Jun. 27, 2017.

(51) Int. Cl.
*E03D 11/00* (2006.01)
*E03D 5/02* (2006.01)
*G01F 23/26* (2006.01)
*E03D 11/13* (2006.01)
*E03D 1/14* (2006.01)

(52) U.S. Cl.
CPC .............. *E03D 11/00* (2013.01); *E03D 5/026* (2013.01); *E03D 11/13* (2013.01); *G01F 23/268* (2013.01); *E03D 2001/147* (2013.01)

(58) Field of Classification Search
CPC ......... E03D 11/00; E03D 11/13; E03D 5/026; E03D 2001/147; E03D 5/10; E03D 5/105; G01F 23/268
See application file for complete search history.

(56) References Cited

U.S. PATENT DOCUMENTS

| 6,052,841 | A * | 4/2000 | Mankin | ..................... E03D 1/00 4/427 |
| 7,636,959 | B2 * | 12/2009 | Bowcutt | ................. E03D 11/00 4/427 |
| 9,163,972 | B2 * | 10/2015 | Veros | ...................... E03D 5/105 |
| 9,896,831 | B2 * | 2/2018 | Bowcutt | ............. G01F 23/0061 |

(Continued)

OTHER PUBLICATIONS

Chinese Office Action dated Sep. 30, 2020 for Chinese Patent Application No. 201880055508.8.

*Primary Examiner* — J C Jacyna
(74) *Attorney, Agent, or Firm* — Knobbe, Martens, Olson & Bear, LLP

(57) ABSTRACT

A system for preventing overflow of a toilet includes a capacitance sensor arrangement as in combination with certain features (e.g., flap valve disablement). The system can detect an overflow flush condition of a toilet by sensing the value of a parameter of one or more normal flush cycles of the toilet and establishing a normal range for the value of the parameter using the sensed value. The system can also store the normal range in a memory for comparison to a value of the parameter during subsequent flush cycles. The system can perform sensing over a predetermined timeframe. The system can include the time frame being sufficient to include the entire push cycle of the toilet.

19 Claims, 11 Drawing Sheets

(56) References Cited

U.S. PATENT DOCUMENTS 10,697,166 B2 * 6/2020 Salemi Parizi ......... E03D 5/026
2008/0141447 A1 * 6/2008 Bowcutt ............. G01F 23/0007
4/427

* cited by examiner

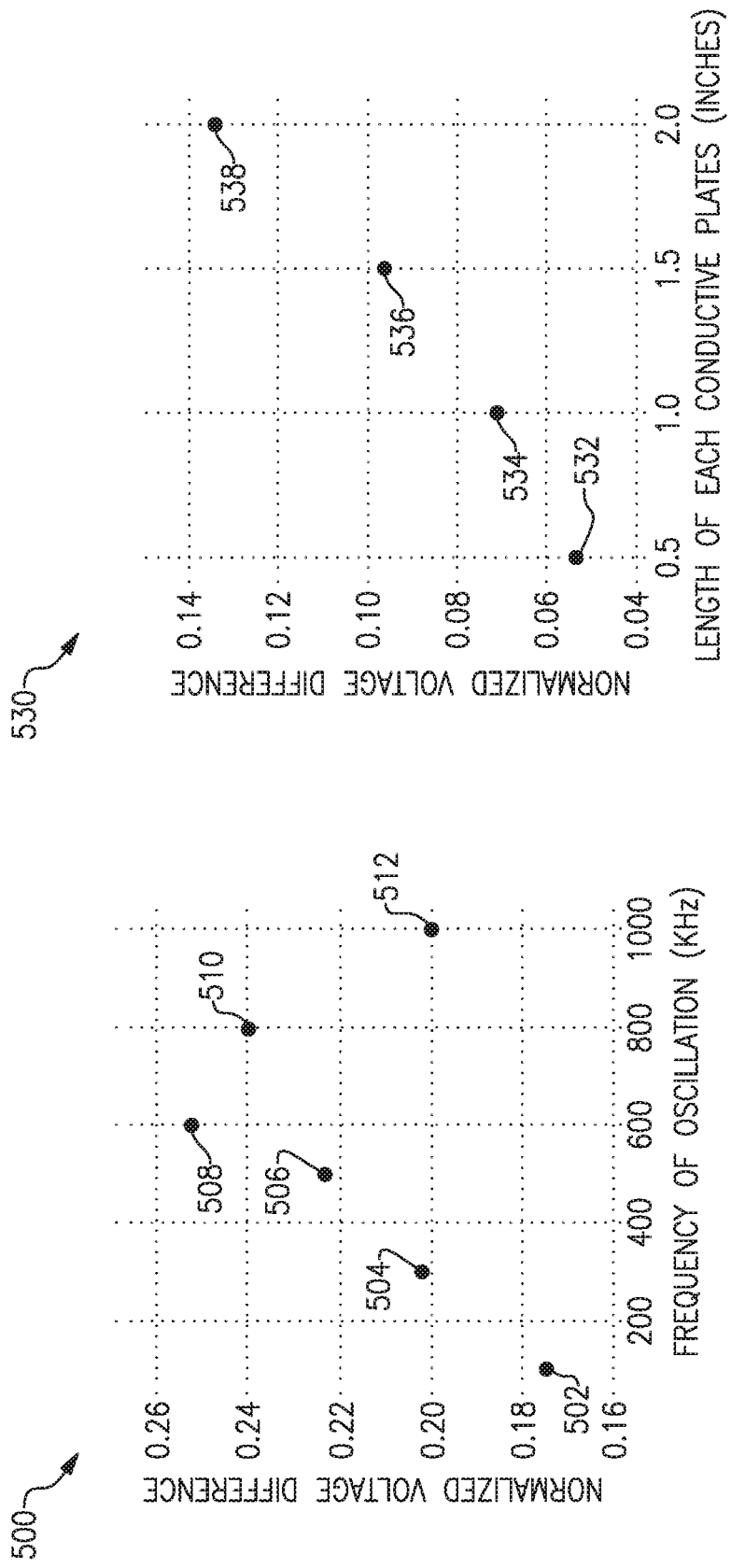

TOILET OVERFLOW PREVENTION SYSTEM AND METHOD

RELATED APPLICATIONS

This application is a continuation of application Ser. No. 16/017,869 filed Jun. 25, 2018, which claims the benefit under 35 U.S.C. § 119(e) of U.S. Patent Application No. 62/525,645, filed Jun. 27, 2017 and U.S. Patent Application No. 62/688,252, filed Jun. 21, 2018, the disclosure of which is hereby incorporated by reference herein in its entirety.

BACKGROUND

Field

The present disclosure generally relates to toilets. More specifically, the present disclosure relates to an overflow prevention devices, systems and methods for a toilet.

Description of Related Art

Although significant advances have been made in toilet technology, particularly in reducing the amount of water needed for flushing purposes, a satisfactory solution for preventing the overflow of a toilet in the event of a blockage of the toilet bowl, or associated waste plumbing, has not been achieved. Existing overflow prevention devices, in order to provide acceptable reliability, are often complex and result in the devices having a high cost. Furthermore, in order to detect all or nearly all actual overflow events, some existing overflow prevention devices result in an undesirable number of false positives—or indications of an overflow event when one does not actually exist. Thus, a need exists for improved toilet overflow prevention systems and methods that address these issues, or at least provide the public with a useful choice.

SUMMARY

Preferred embodiments of the present disclosure operate to prevent toilet overflow in a cost-effective and reliable manner. In addition, preferred embodiments may be integrated into a toilet assembly during manufacture or retrofitted into an existing toilet, preferably with little or no modification of the standard toilet. Embodiments intended for retrofitting in existing toilets desirably require a low level of skill to install.

An aspect of the present disclosure involves a system and method of preventing toilet overflow utilizing a capacitance sensor arrangement in combination with certain other system features (e.g., flap valve disablement) of the present disclosure. In an optional embodiment, the system and method can utilize a calibration process substantially as described herein.

Still another aspect of the present disclosure involves a method of calibrating a system for detecting an overflow flush condition of a toilet comprising sensing the value of a parameter of one or more normal flush cycles of the toilet and establishing a normal range for the value of the parameter using the sensed value. The method may also include storing the normal range in a memory for comparison to a value of the parameter during subsequent flush cycles. The method may further include the sensing being performed over a predetermined timeframe. The method may still further include the time frame being sufficient to include the entire push cycle of the toilet.

Another aspect of the present disclosure involves a method of determining the existence of an overflow flush condition of a toilet comprising sensing a value of a parameter of a flush cycle caused by water dynamics within the toilet, comparing the sensed value of the parameter to a normal range of values for the parameter and determining that an overflow flush condition exists if the sensed value is outside of the normal range.

BRIEF DESCRIPTION OF THE DRAWINGS

These and other features, aspects, and advantages of the present systems and methods are described in connection with preferred embodiments of the disclosure, in reference to the accompanying drawings. The illustrated embodiments, however, are merely exemplary and are not intended to limit the disclosure. The drawings include the following figures.

FIG. 5A is a graph of normalized voltage difference versus frequency of oscillation for a toilet overflow prevention system according to some embodiments.

FIG. 5B is a graph of normalized voltage difference versus conductive plate length for a toilet overflow prevention system according to some embodiments.

DETAILED DESCRIPTION

Figure 1A:
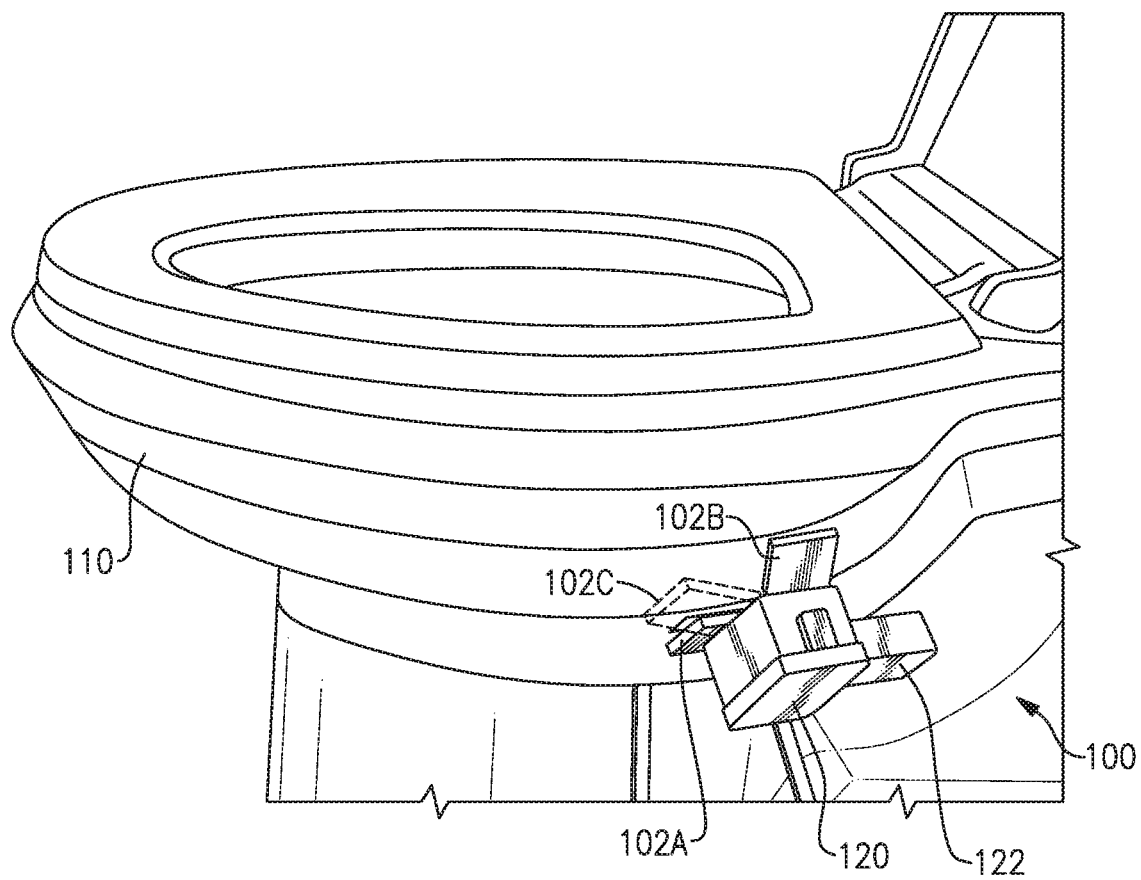
FIG. 1A illustrates a toilet overflow detection portion of an embodiment of a toilet overflow prevention system disposed on a toilet bowl.

The systems and methods disclosed herein that include a capacitance sensor can be utilized with or without other features of the systems and methods described herein. For example, the overall system can comprise the described sensor arrangements alone, in combination with some or all of the other portions of the system, or in combination with other components, assemblies or portions suitable for use with the system. Corresponding methods are also included. The overall system can utilize the flapper valve disabling mechanism disclosed herein. Those skilled in the art will recognize different embodiments made possible by various combinations of features and methods described herein.

Neglected toilet overflow can cost thousands of dollars as a result of mold growth and damage to furniture, upholstery, electronics, and household appliances. The systems and methods disclosed herein involve an overflow system configured to detect such events, preferably prior to an actual overflow from the toilet bowl. The systems and methods use a novel capacitive sensing technique that relies on the sizable difference between the dielectric constants of water and/or air for tracking changes in water level. The capacitive sensing technique utilizes a sensor that is outside of the toilet bowl, such that little to no hardware is required inside the toilet bowl. Furthermore, the capacitive sensing technique can reduce overall power usage, allowing for improved operational duration. The capacitive sensing technique can improve detection of actual overflow conditions while reducing false positives in comparison to prior art systems.

Overview of Liquid-Level Sensing Techniques

Optical fiber-based techniques can use fiber optic cables to measure time-of-flight of an optical signal as it is emitted and reflected, which is called time-domain reflectometry. This technique is not well suited for toilets because these techniques typically require either transparent containers or direct liquid contact. Standard toilets are made with opaque porcelain, and direct contact with toilet water raises sanitation concerns. Thoroughly cleaning dirty toilet overflow prevention systems that are in direct contact with toilet water can also lead to damage to the system.

Mechanical vibration sensors are better suited in situations where vibration is predictable and always a direct result of liquid motion, such as in industrial settings. For example, mechanical vibration-based approaches typically are used when containers are able to vibrate, such as in pipes or storage tanks. However for toilets, it has been discovered that users can introduce unpredictable vibrations that may produce a great deal of noise and trigger false positives.

Ultrasonic sensors, like optical sensing, typically use time-of-flight to estimate liquid-level in pipes and storage tanks. Ultrasonic sensor electrodes often have to be precisely placed around the container to properly measure the signal of interest. Thus, ultrasonic sensors are not well suited to the large variation in toilet designs. Furthermore, ultrasonic sensors become prohibitively expensive in certain applications.

Pressure-sensitive diaphragms can be placed just below the container or on the exit valve of the container to measure the liquid level. However, installation can be cumbersome for applications where the container has already been installed. Furthermore, pressures sensors are often not viable in situations without physical contact with the liquid.

Radio frequency identification (RFID) tags can identify a dielectric constant of the liquid as a dispersive medium that changes phase and received signal strength indicator (RSSI). However, this requires closed loop calibration for precise measurement. Moreover, radio frequency identification (RFID) readers can be expensive and bulky.

Radio Detection and Ranging or Radio Direction and Ranging (RADAR) techniques can employ time-domain reflectometry or ground penetration radar-based techniques. RADAR technology may be placed outside on the container's walls. However, RADAR technology is typically expensive and requires a significant amount of power.

Certain toilet prevention systems detect overflow by detecting water on the floor or that come in contact with conductivity sensors that are placed on the outside of the bowl. Such systems suffer from sanitation issues and detect an overflow event after the water is already out of the bowl and on the floor.

Capacitance Sensing Technique

Aspects of the present disclosure relate to technical solutions using capacitance sensing that can alleviate or address some or all of the challenges described above. Systems and methods disclosed herein relate to the detection of water overflow events in a toilet without requiring and/or minimizing the need to place sensors inside the toilet bowl. In some embodiments, since direct contact with the water is not required, the toilet overflow prevention system using a capacitance sensor arrangement can be more easily installed and is more sanitary than other systems described above. The toilet overflow prevention system may also provide acceptable performance and be easy to install on most existing toilets, even with variation in toilet design. Furthermore, the toilet overflow prevention system can reduce power consumption and can be manufactured with reduced cost compared to many existing designs.

FIG. 1A illustrates an embodiment of a toilet overflow detection portion 100 of an embodiment of a toilet overflow prevention system disposed on a toilet bowl 110. The detection portion 100 can include two conductive plates 102A, 102B (or electrodes), a housing 120, and a battery 122.

The two conductive plates 102A, 102B of the detection portion 100 are attached to an exterior surface of the outer sidewall of the toilet bowl 110, thus not having to be in contact with the toilet water inside the bowl. One or both of the two conductive plates 102A, 102B can include one or more degrees of freedom relative to the housing 120 to allow the plates 102A, 102B to move (e.g., pivot or rotate) and better conform to the shape of the individual toilet bowl to which the detection portion 100 is attached. In other arrangements, the plates 102A, 102B can be flexible along one or more axes to allow the plates 102A, 102B to bend and conform or somewhat conform to the shape of the toilet bowl. Such an arrangement provides the detection portion 100 with the flexibility to be affixed to various toilet bowl shapes and sizes. As described at least with respect to FIG. 2, detection portion 100 can include within or carried by the housing 120 a suitable sensor to detect a dielectric constant between the two conductive plates 102A, 102B. The housing 120 can also include an extension for a battery 122.

The conductive plates 102A, 102B can be made of a relatively low-cost and/or readily-available material, such as copper. The plates 102A, 102B can be in the form of copper plates or copper tapes. The toilet overflow detection portion 100 can utilize the two conductive plates 102A, 102B to employ time domain reflectometry. The toilet overflow detection portion 100 can determine changes in the static electric field for detecting changes in a dielectric medium, such as a liquid level. As such, the toilet overflow detection portion 100 can advantageously reduce and/or eliminate ambient factors, such as vibration, sound, and pressure, from interfering with an accurate detection of the water height or level in the toilet bowl.

Figure 1B:
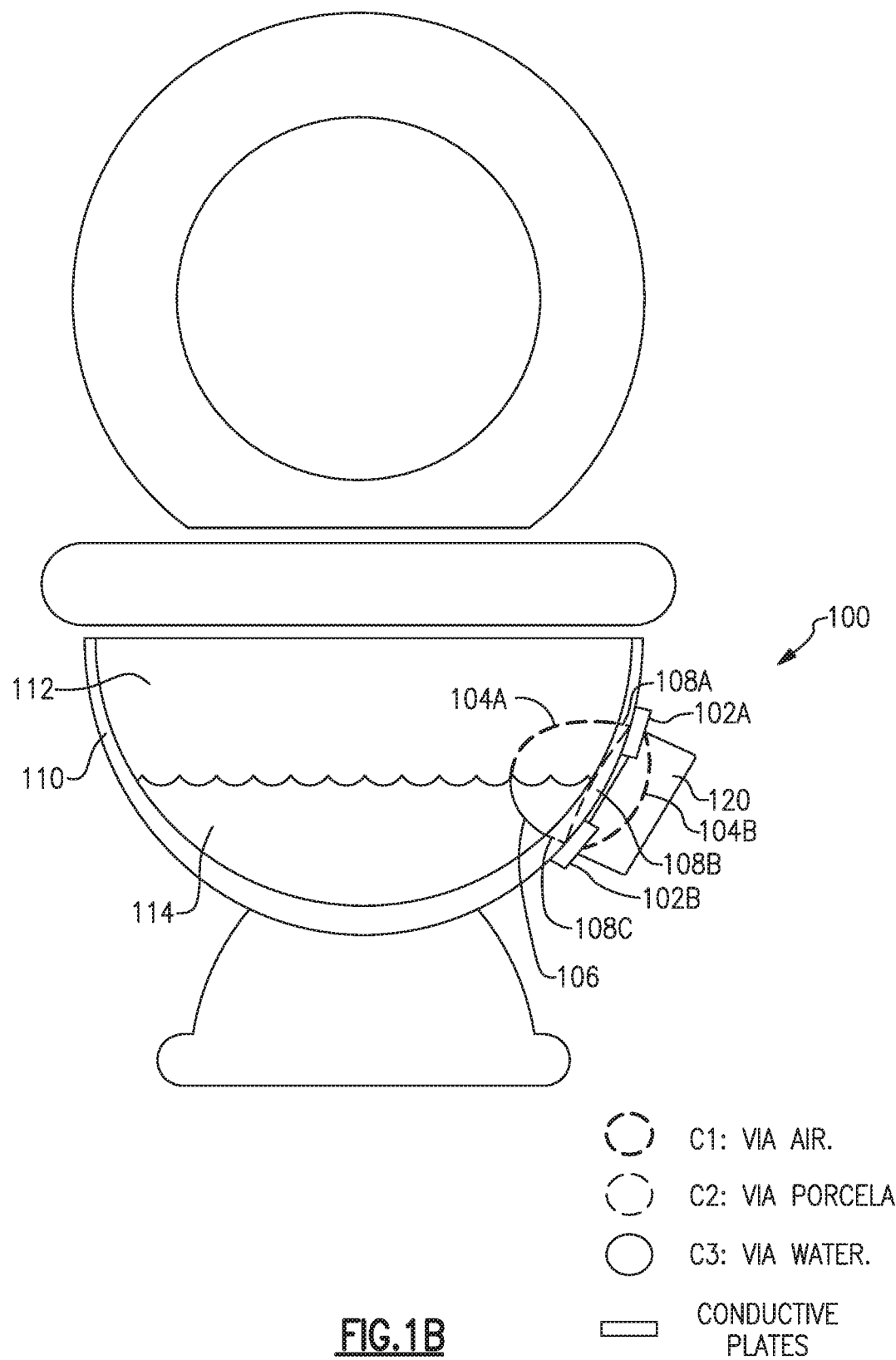
FIG. 1B illustrates capacitance sensing by the overflow detection portion of the toilet overflow prevention system of FIG. 1A.

In some embodiments, three or more conductive plates can be used to detect water height, such as conductive plates 102A, 102B, 102C. For example, three conductive plates each of which are individually smaller than that of the embodiment with two conductive plates can be used to be able to measure water height in a more granular manner while reducing power consumption. In such an arrangement, the electric field paths between any pair of the conductive plates may be similar to the field paths as illustrated in FIG. 1B. Otherwise, the general sensing principle can be the same as or substantially similar to that described in connection with the illustrated two-plate arrangement.

Capacitance Sensing of Porcelain, Air, and Water

FIG. 1B illustrates capacitance sensing by the toilet overflow prevention system according to some embodiments. The toilet overflow prevention system can include the toilet overflow detection portion 100 as illustrated in FIG. 1A.

The toilet overflow detection portion 100 can detect a variable dielectric between the two conductive plates 102A, 102B, utilizing a parallel fringing effect, which includes a fringing capacitance between the two conductive plates 102A, 102B. The two conductive plates 102A, 102B can be disposed generally side-by-side on a substantially similar plane. That is, the side wall of a toilet bowl is typically curved, but the curve is shallow or has a relatively large radius of curvature. Thus, when positioned on the side of the toilet bowl a practical distance apart, the conductive plates 102A, 102B are generally in a side-by-side arrangement for the purpose of describing the electric field paths created by the arrangement.

The toilet overflow detection portion 100 can detect a capacitance between the two conductive plates 102A, 102B. As indicated above, a plurality of electric field paths extends between the conductive plates 102A, 102B. For example, the toilet overflow detection portion 100 can detect the capacitance related to the electric field paths through air (C1) 104A, 104B, through porcelain (C2) 108A, 108B, 108C, and through water (C3) 106. Since the conductive plates 102A, 102B are substantially in a parallel field, the total capacitance between the two plates can include the electric field path through porcelain 108C, through water 106, through air 104A, and through the porcelain 108A. Because the shape and material of the toilet is constant, the measurable variation in capacitance can be described as a function of the water height inside the bowl. Although humidity and other factors may have some effect, the dielectric constant of water is much higher than that of porcelain and air that the humidity and other factors can be negligible. For example, the dielectric constant of water can be roughly a factor of 80, whereas the porcelain can be a factor of 6 and air a factor of 1. Thus, measuring the capacitance between the conductive plates 102A, 102B can be substantially associated with the height of water in the toilet bowl 110. The measured capacitance, $C_{water}$, $C_{air}$, and $C_{porcelain}$ can be represented by:

$$C_{water} = \frac{\varepsilon_0 \cdot \varepsilon_w \cdot A}{h_w}$$

$$C_{air} = \frac{\varepsilon_0 \cdot \varepsilon_a \cdot A}{h_a}$$

$$C_{porcelain} = \frac{\varepsilon_0 \cdot \varepsilon_p \cdot A}{h_p}$$

where $h_w$ can represent the height of the water in the bowl, $h_a$ can represent the height of the air in the bowl from the top plate, and $h_p$ can represent the thickness of the porcelain. $\varepsilon_w$, $\varepsilon_a$, and $\varepsilon_p$ can represent the relative permittivity of water, air, and porcelain, respectively. $\varepsilon_0$ can represent the permittivity of free space, and A can represent the area of the electrodes.

Because the dielectrics can be stacked serially, the total capacitance can be represented by:

$$C_3 = \frac{1}{\frac{1}{C_{porcelain}} + \frac{1}{C_{water}} + \frac{1}{C_{air}} + \frac{1}{C_{porcelain}}}$$

$$C_3 = \frac{\varepsilon_0 \cdot \varepsilon_w \cdot \varepsilon_a \cdot A \cdot C_{porcelain}}{C_{porcelain}(D \cdot \varepsilon_w - h_w(\varepsilon_w - \varepsilon_a)) + 2\varepsilon_0 \cdot \varepsilon_w \cdot \varepsilon_a \cdot A}$$

where D can represent the distance between the conductive plates 102A, 102B.

However, since $\varepsilon_w$ can be much larger than $\varepsilon_0$, $\varepsilon_w$ can be small and negligible. Thus, the total capacitance can be represented by:

$$C_3 = \frac{\alpha \cdot C_{porcelain}}{C_{porcelain}(D - h_w) + 2\alpha}$$

Since $C_{porcelain}$ and $\alpha$ can be constant, the effective capacitance of the toilet overflow detection portion 100 can vary due to the change in the height of water. As the height of the water ($h_w$) increases, $C_3$ also increases and therefore the total capacitance between the two plates increases, allowing more AC current to pass from one conductive plate 102B to the other conductive plate 102A, and/or vice versa.

Illustrative Hardware Implementation of Toilet Overflow Prevention System

Figure 2:
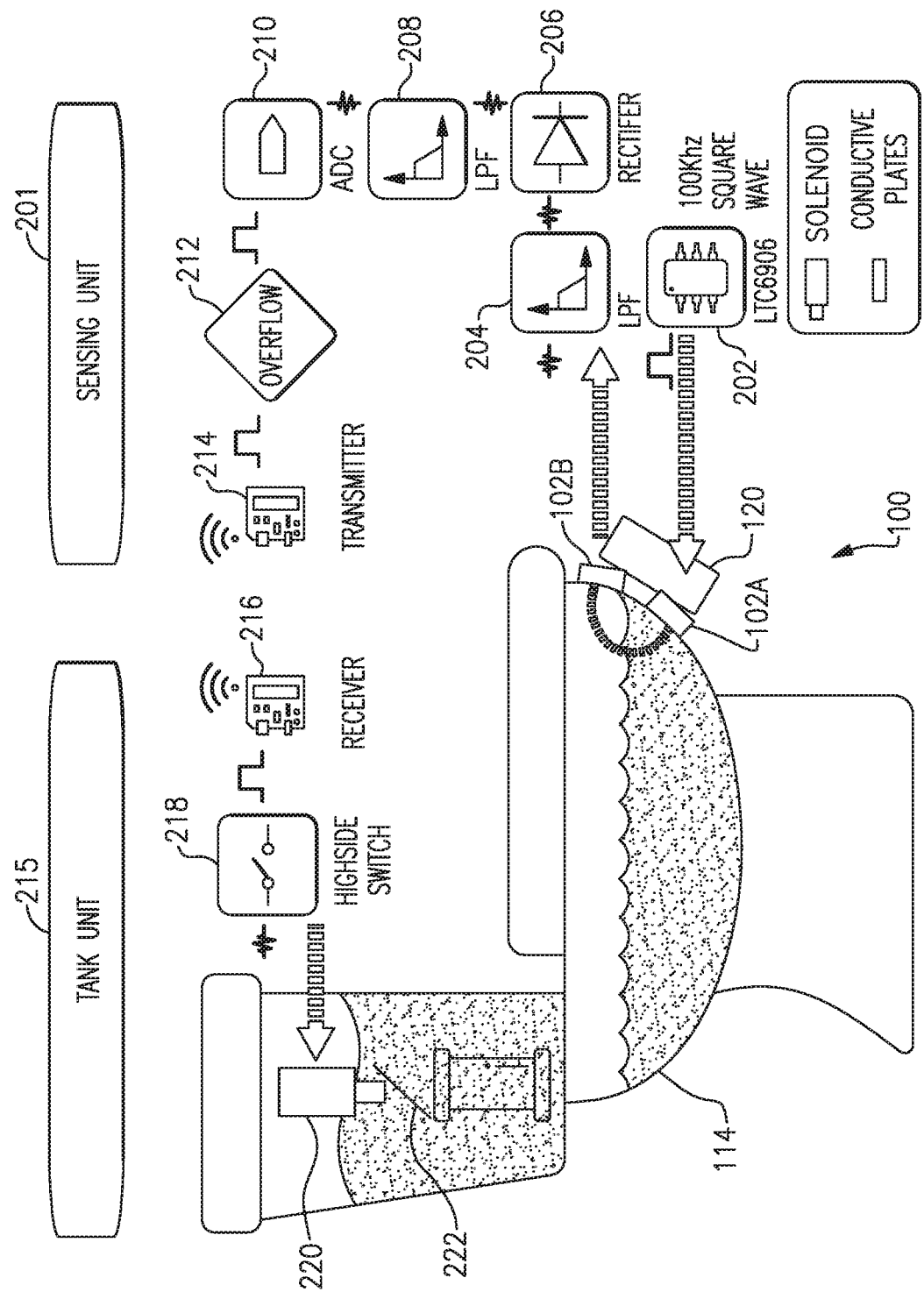
FIG. 2 illustrates a hardware implementation of the toilet overflow prevention system according to some embodiments.

FIG. 2 illustrates a hardware implementation of the toilet overflow prevention system according to some embodiments. The toilet overflow prevention system can include the toilet overflow detection portion 100 as illustrated in FIGS. 1A and/or 1B.

The toilet overflow prevention system can include a sensing unit 201 and a tank unit 215. The overflow detection portion 100 can consist of or can include the sensing unit 201. The sensing unit 201 can include a square wave generator 202, a first low pass filter 204, a rectifier 206, a second low pass filter 208, an analog-to-digital converter 210, an overflow detector 212, a transmitter 214, conductive plates 102A, 102B, and/or a housing 120. The tank unit 215 can include a receiver 216, a highside switch 218, and/or a solenoid 220.

The square wave generator 202 can generate a square wave to be transmitted from a first conductive plate 102A to be received by a second conductive plate 102B or vice-versa. The generated signal can be an AC signal sent to one of the conductive plates 102A. The square wave can be excited by a voltage source, such as a 5 volt source, and be characterized by a duty cycle and a frequency, such as a 50% duty cycle square wave at 100 kHz. As such, the toilet overflow detection portion 100 can reduce the average power consumption based on the generated square wave.

The received signal can be filtered using the first low pass filter 204, rectified using the rectifier 206, filtered using the second low pass filter 208, converted to a digital signal by sampling the signal using the analog-to-digital converter 210, and assessed to determine whether an overflow condition has occurred and/or is impending by the overflow detector 212. One example method of the assessment to determine whether an overflow condition has occurred and/or is impending is described further below.

If it is determined that an overflow condition has occurred and/or is impending, the toilet overflow prevention system can respond to the overflow condition, such as by shutting off water flow from the tank to the bowl. For instance, the overflow detection portion 100 can transmit a signal to the tank unit 215 using a transmitter 214 to activate the shut-off mechanism. The tank unit 215 can receive the signal using a receiver 216, turn on the highside switch 218, and activate the solenoid 220 which can initiate a process or actuate a mechanism to stop the flow of water, such as by closing a flapper valve 222 of the toilet. A small solenoid 220 can be added to the toilet tank to close the flapper valve 222 and prevent additional water from entering the toilet bowl 114. Once the flapper valve 222 is closed, the user can address the issue causing the overflow. Once the user alleviates the overflow condition, a signal can be transmitted to the tank unit 215 to switch off the switch 218 and deactivate the solenoid 220.

Illustrative Exploded View of Toilet Overflow Prevention System

Figure 3:
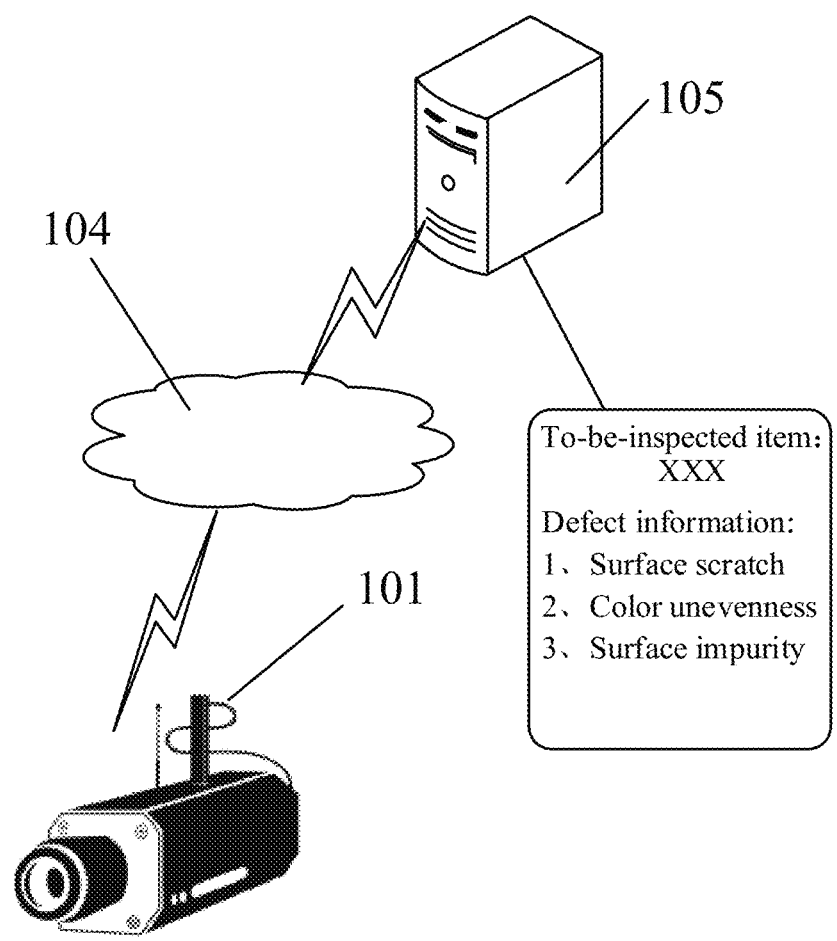
FIG. 3 illustrates an exploded view of the overflow detection portion of the toilet overflow prevention system of FIG. 1A.

FIG. 3 is an exploded view of the toilet overflow detection portion 100 as illustrated in FIGS. 1A, 1B, and 2. The toilet overflow detection portion 100 can include conductive plates 102A, 102B, a pivoting housing 304A, 304B, a sensor housing 120A, 120B, a printed circuit board (PCB) 302, and a battery 122.

As described above, the conductive plates 102A, 102B can be or include a copper material. In the illustrated arrangement, the conductive plates 102A, 102B are or include a copper foil tape. Each one of the conductive plates 102A, 102B can be attached to or carried by a movable portion of the detection portion 100, which can be one of a pair of the pivoting housings 304A, 304B. Each of the pivoting housings 304A, 304B can move (e.g., pivot) relative to the sensor housing 120A to allow the detection portion 100 to adjust and conform to various toilet designs. In some embodiments, each of the pivoting housing 304A, 304B can include a hinge that allows for pivoting of the pivoting housing 304A, 3304B with respect to the sensor housing 120 along the hinge. In some embodiments, the pivoting housing 304A, 304B can include other mechanisms to conform to various toilet designs, such as a plurality of hinges, a malleable surface, a hinge located in a different location, a lock, a fastening mechanism, and/or the like.

The sensor housing 120A, 120B can house the PCB 302 that senses the dielectric constant across the conductive plates 102A, 102B. As will be appreciated by those skilled in the art, the PCB 302 can include the hardware and software components as shown in and described in connection with FIG. 2 or that are otherwise necessary or desirable to carry out the overflow detection and/or prevention methodology described herein. For example, the PCB 302 can include a memory 301 and a processor 303. The sensor housing 120A, 120B can house other parts of the toilet overflow detection portion 100, such as the battery 122, the conductive plates 102A, 102B, wiring (not shown), and/or the like.

Toilet Overflow Prevention System Overflow Condition Identification

Figure 4B:
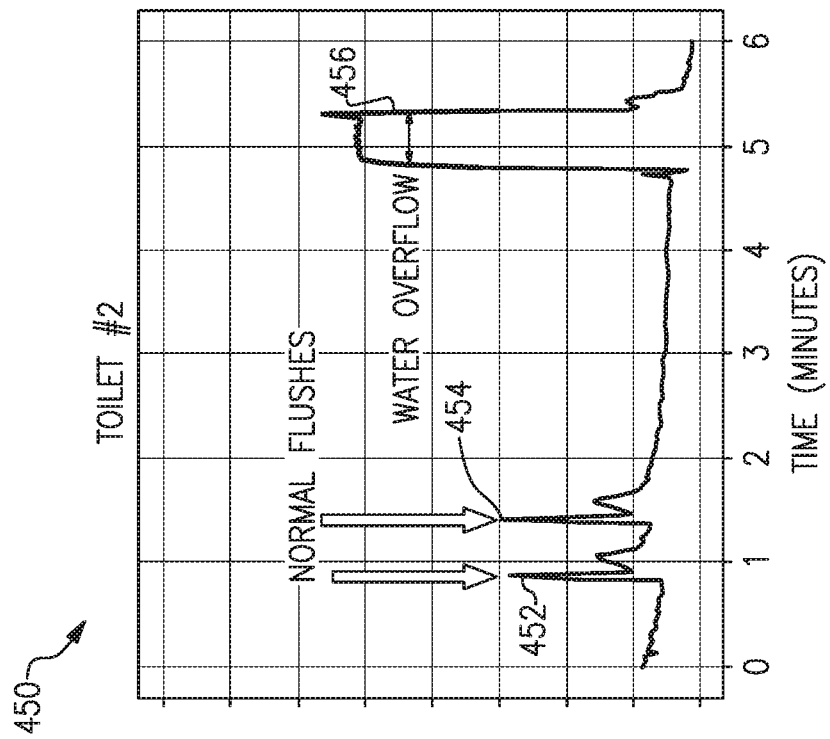
FIGS. 4A and 4B are graphs of normalized voltage values determined by the sensor portion and relating to water level in the toilet over time to illustrate the identification of an overflow condition by the toilet overflow prevention system for two different toilets.
Figure 4A:
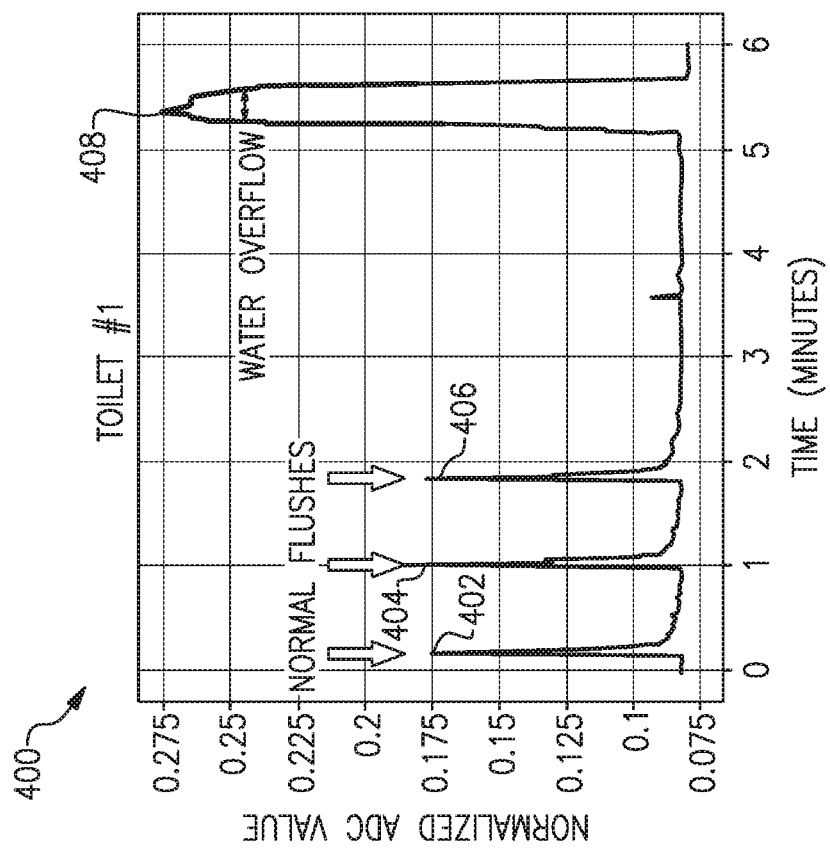

FIGS. 4A and 4B are graphs 400, 450 that illustrate the determination of an overflow condition in two different toilets by the toilet overflow prevention system according to some embodiments. The toilet overflow prevention system can produce an analog signal that correlates to the level of water in the toilet bowl. However, given the vast variation in toilet bowl design and shape, the movement of water in the toilet bowl during a flush and during clogging can also vary. As such, the toilet overflow prevention system can detect water flow signatures over time to differentiate between an overflow condition and a normal flush.

In addition or in the alternative, the toilet overflow prevention system can be calibrated for the particular toilet on which it is installed. The calibration process can occur during manufacture of the toilet overflow prevention system, such as during manufacture of the toilet overflow detection portion 100. For example, such a calibration process could take into account the broad category of toilet type, toilet brand, toilet model, bowl shape or other relevant factor (e.g., country or region designations). Thus, different models of the system could be sold or the system could utilize a suitable user interface to allow selection of an appropriate calibrated mode of operation. However, the calibration process preferably occurs after installation on a specific toilet with which the system will be used. The calibration can be conducted after installation and before normal usage of the toilet. For example, the user could be instructed to conduct multiple flushes in succession to execute the calibration process. In other arrangements, the calibration process can occur over the first several normal flush cycles of the toilet. In other words, the user will simply commence regular use of the toilet after installation of the system and the system will utilize a number of the subsequent flushes to calibrate itself to the toilet.

As illustrated in the graphs 400 and 450 of FIGS. 4A and 4B, the user and/or the toilet overflow prevention system can perform calibration by initiating one or more normal flushes, such as the normal flushes 402, 404, 406, 452, 454. Based on a characteristic signature of the toilet bowl water for a normal flush 402, 404, 406, 452, 454, the toilet overflow prevention system can determine a threshold and/or rules for determining a water overflow condition 408, 456. As described above, in some embodiments, the user can manually perform one or more normal flushes in succession as part of the calibration process. Or, in some embodiments, the toilet overflow prevention system can automatically identify the one or more normal flushes during normal use and/or automatically perform self-calibration during normal use.

A water overflow condition 408, 456 can be determined based on any suitable characteristic(s) of the flush signature. For example, a water overflow condition 408, 456 can be based in whole or in part on the magnitude of the sensed voltage (which preferably relates to water level) and/or the duration of a voltage peak. As illustrated in FIG. 4A and FIG. 4B, the duration of the toilet bowl water above a certain threshold as indicated by the normalized voltage value can be useful in distinguishing normal flushes from overflow conditions. For example, the width of the normal flushes 402, 404, 406, 452, 454 can be significantly shorter than a water overflow condition 408, 456 as shown in the graphs, which corresponds to shorter time periods for a normal flush 402, 404, 406, 452, 454 versus an overflow condition 408, 456. In addition or in the alternative, the water overflow condition 408, 456 can be based on the magnitude of the water height. For example, as illustrated in FIG. 4A and FIG. 4B, a water overflow condition 408, 456 has a much higher peak than the normal flushes 402, 404, 406, 452, 454 for the same toilet.

The system can utilize the normal flush information to identify characteristics that can be used to for comparison with future flush events to accurately identify overflow conditions. Such characteristics can be or include, for example, averages or maximum values of the normal flushes. For example, an average peak voltage of a normal flush and/or an average duration of a normal flush can be determined. Based in this determination, the system can determine a normal flush threshold, an overflow threshold, and/or set of criteria (referred to herein as a "threshold" for convenience) for determining the existence of an overflow condition 408, 456. The threshold can be predefined (e.g., a particular increase in the peak voltage and/or duration relative to the average value). The threshold can remain constant after the initial calibration or can be reassessed over time. For example, the system can keep a running average of peak voltage and/or duration, or could conduct an automatic calibration update after a particular period of time to take into account changes in environmental or other factures that could have an impact on the values determined during the initial calibration. The overflow threshold can be set to a value above the normal flush threshold, such as a particular value above or a percentage above the normal flush threshold.

In some embodiments, the slope of the change in water level and/or other derivative of the water level can be used to determine an overflow condition. If the slope of the water level is increasing, a state machine can consider the current state a "rising state" of toilet water level. If the slope of the water level is decreasing, the state machine can consider the current state a "peak" state during the transition and/or a "falling" state thereafter if the negative slope continues. During the "peak state," the toilet overflow prevention system can track how long the water level is at the "peak state" such as by utilizing a timer. If the water is at a "peak state" for a period of time beyond a certain threshold, the toilet overflow prevention system can set an overflow condition. If the water level falls below the water level for the "peak stake" or a threshold based on the water level for the "peak stake," the toilet overflow prevention system can set a non-overflow condition.

In some embodiments, if the toilet overflow prevention system misses an overflow condition based on the rise of the water, the toilet overflow prevention system can identify the overflow condition hereafter when the water continues to rise and/or rises above both conductive plates 102A, 102B. Then, the toilet overflow prevention system can identify a large water height measurement, providing another opportunity to identify an overflow water condition.

In some embodiments, the water overflow condition 408, 456 can be determined based on optimization of accuracy of water overflow conditions and/or minimizing false positives. Missing a water overflow condition and/or false positives can result in costly overflow or requiring users to manage a system that is connected to a toilet that is not currently in an overflow condition, respectively. It is desirable to reduce or minimize the incident of false positives to limit or eliminate user annoyance in having to unnecessarily reset the system.

In order to reduce power consumption, the toilet prevention overflow system can check the water level voltage periodically, such as once every 0.1 seconds. In some embodiments, the toilet prevention overflow system can vary the frequency of the check, such as checking more often when the water voltage level meets a certain threshold.

Frequency Oscillation Optimization for Toilet Overflow Prevention System

FIG. 5A illustrates a graph 500 for frequency oscillation optimization for a toilet overflow prevention system according to some embodiments. The graph illustrates oscillation frequencies that excite a conductive plate to be received by another conductive plate after propagating through a toilet structure, such as porcelain. The graph 500 for frequency oscillation optimization illustrates oscillation frequency and a measure of the dielectric constant.

As illustrated in graph 500 for frequency oscillation optimization, as the frequency increases, the normalized analog-to-digital converter value (the dielectric constant) increases due to enhanced coupling, up to a certain frequency and decreases thereafter, due to worsened coupling. For example in a particular toilet bowl design, as the frequency oscillation increases 502, 504, 506, 508, the normalized voltage difference increases, and as the frequency oscillation increases thereafter 510, 512, the normalized voltage difference decreases. As such, the toilet overflow prevention optimization can determine an optimal frequency for varying toilet bowls based on normalized voltage difference measurements across various frequency oscillations.

In some embodiments, the selection of frequency oscillation can be based on one or more factors, such as the normalized voltage difference in the dielectric constant, or power consumption. The selection of frequency oscillation can be based on the frequency oscillation that provides the smallest power consumption among a list of frequency oscillations that meets a certain voltage difference threshold. For example, if the threshold is a normalized voltage difference is 0.15, then the frequencies of oscillation 502, 504, 506, 508, 510, 512 all meet the threshold. As such, the frequency (100 kHz) with the smallest power consumption 502 can be selected. If the normalized voltage difference is higher, the detection portion 100 may be able to detect overflow conditions with enhanced resolution. However if the normalized voltage difference is above a certain threshold, the resolution of detecting overflow conditions may not be significant, and as such, the reduction of power consumption may become more important. In some embodiments, the preferred frequency is 100 kHz. The selection of frequency oscillation can be factory set or can form part of the calibration process.

Conductive Plate Length Optimization for Toilet Overflow Prevention System

FIG. 5B illustrates a graph 530 for conductive plate length optimization for a toilet overflow prevention system according to some embodiments. The graph 530 for conductive plate length optimization illustrates the relationship between the length of each conductive plate and the normalized voltage difference of the dielectric constant.

In the example of the graph 530, with increased length of each conductive plate, 532, 534, 536, 538, the normalized voltage difference between the conductive plates increase because the capacitance can be a function of the plate area resulting in an increased observable capacitance between the conductive plates. In some embodiments, the determination of the size of the conductive plates can be based on a factor that affects the size of the capacitive area for the conductive plates, such as the width, the shape, the thickness, and/or the like. When the length of each conductive plate increases, the conductive plate area increases, thus resulting in a larger difference between the signals at the conductive plates. In some embodiments, after a certain threshold normalized voltage difference is met, a relatively small or the smallest length of the conductive plates can be selected because of size considerations, such as for smaller packability of the overall detection portion of the toilet overflow system and/or the ease of conforming to various toilet shapes and designs. In some configurations, the conductive plates 102A, 102B have dimensions of about 1-1.5 inches by about 1-1.5 inches, or about 1.25 by about 1.25 inches.

In some embodiments, the length of the conductive plate can be based on one or more factors, such as a desired normalized voltage difference and/or the overall size of the toilet overflow prevention system.

Figure 5C:
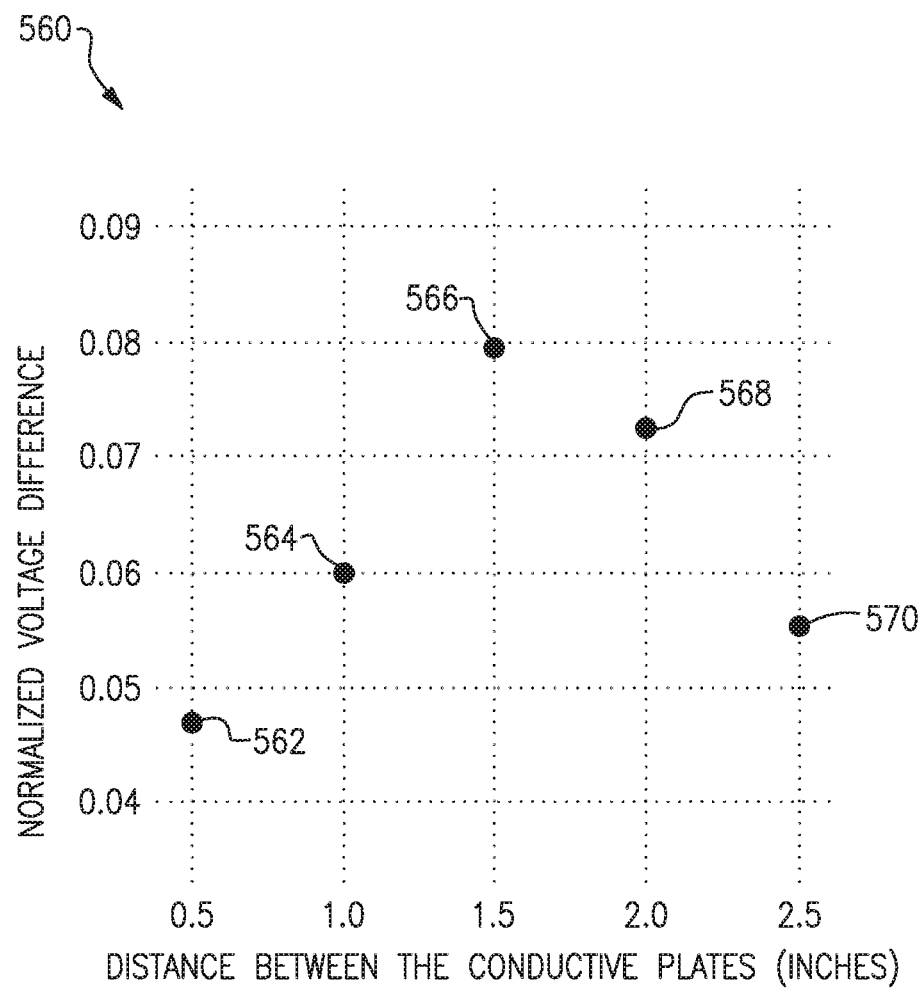
FIG. 5C is a graph of normalized voltage difference versus distance between conductive plates for a toilet overflow prevention system according to some embodiments.

Distance Between Conductive Plates Optimization for Toilet Overflow Prevention System FIG. 5C illustrates a graph 560 for distance between conductive plates optimization for a toilet overflow prevention system according to some embodiments. The graph 560 illustrates the relationship between the distance between the two conductive plates 562, 564, 566, 568, 570 and the normalized voltage difference of the dielectric constant.

If the distance between the two conductive plates is small, the coupling for the two conductive plates can take more weight in the capacitance value because the path across the air between the two electrodes gets more AC voltage and can have more weight than the difference that is generated by the change in the water level. If the distance between the two conductive plates is large, the coupling between the two conductive plates can have less weight and thus, the total capacitance can become smaller, making it harder to differentiate between idle water levels and flush water levels.

In some configurations, a distance between the conductive plates 102A, 102B is between about 1-2 inches, or about 1.5 inches. In some embodiments, the distance between the conductive plates can be based on the size and/or the length of the conductive plates. For example, larger conductive plates may provide increased observed capacitance, and as such, the distance between the conductive plates may not have to be as large as that for smaller conductive plates for detection of overflow conditions.

Normal and Overflow Thresholds for Toilet Overflow Prevention System

Figure 6A:
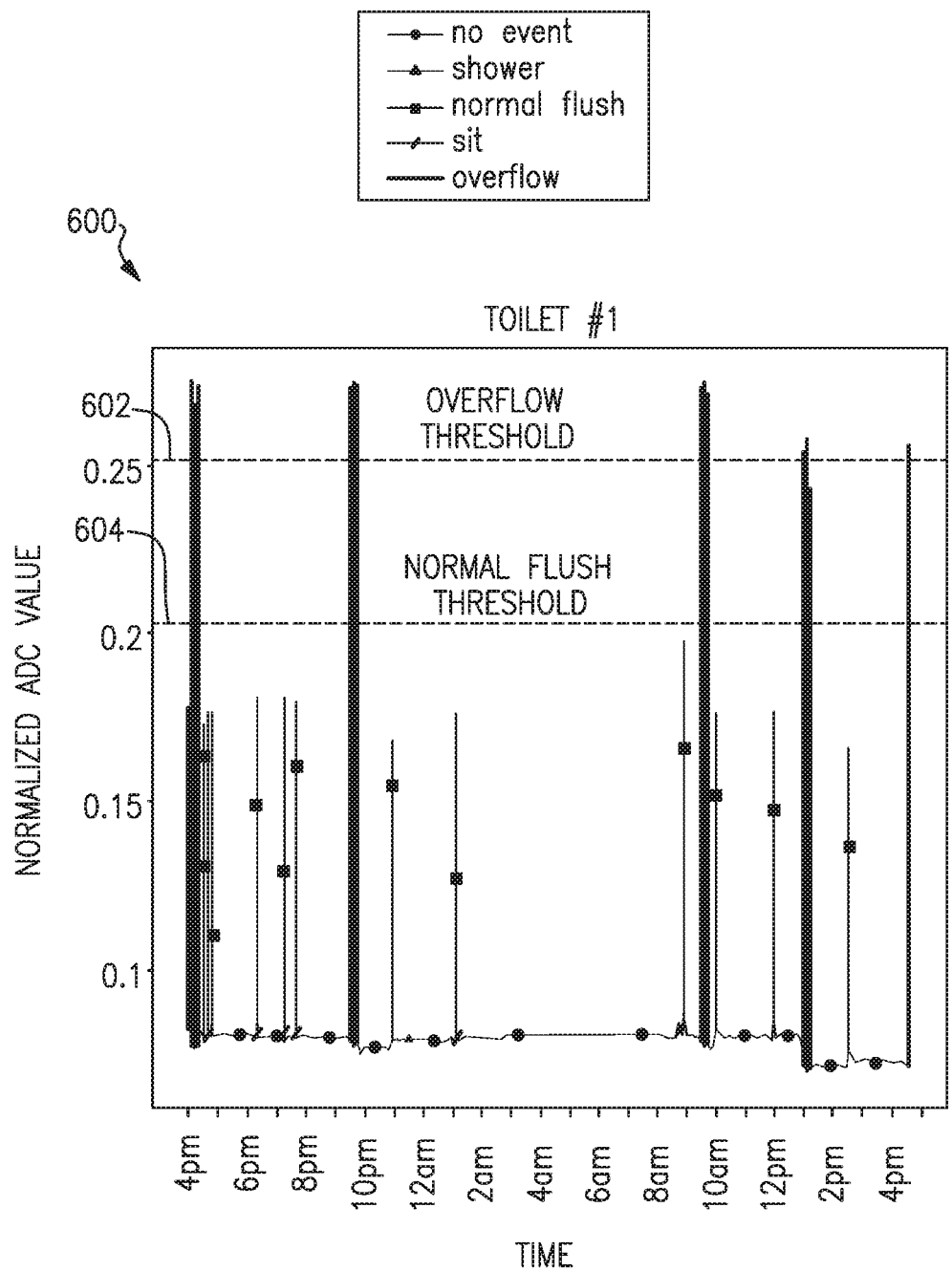
FIGS. 6A and 6B are graphs of normalized voltage value over time and illustrating a normal flush threshold and an overflow threshold for a toilet overflow prevention system according to some embodiments.
Figure 6B:
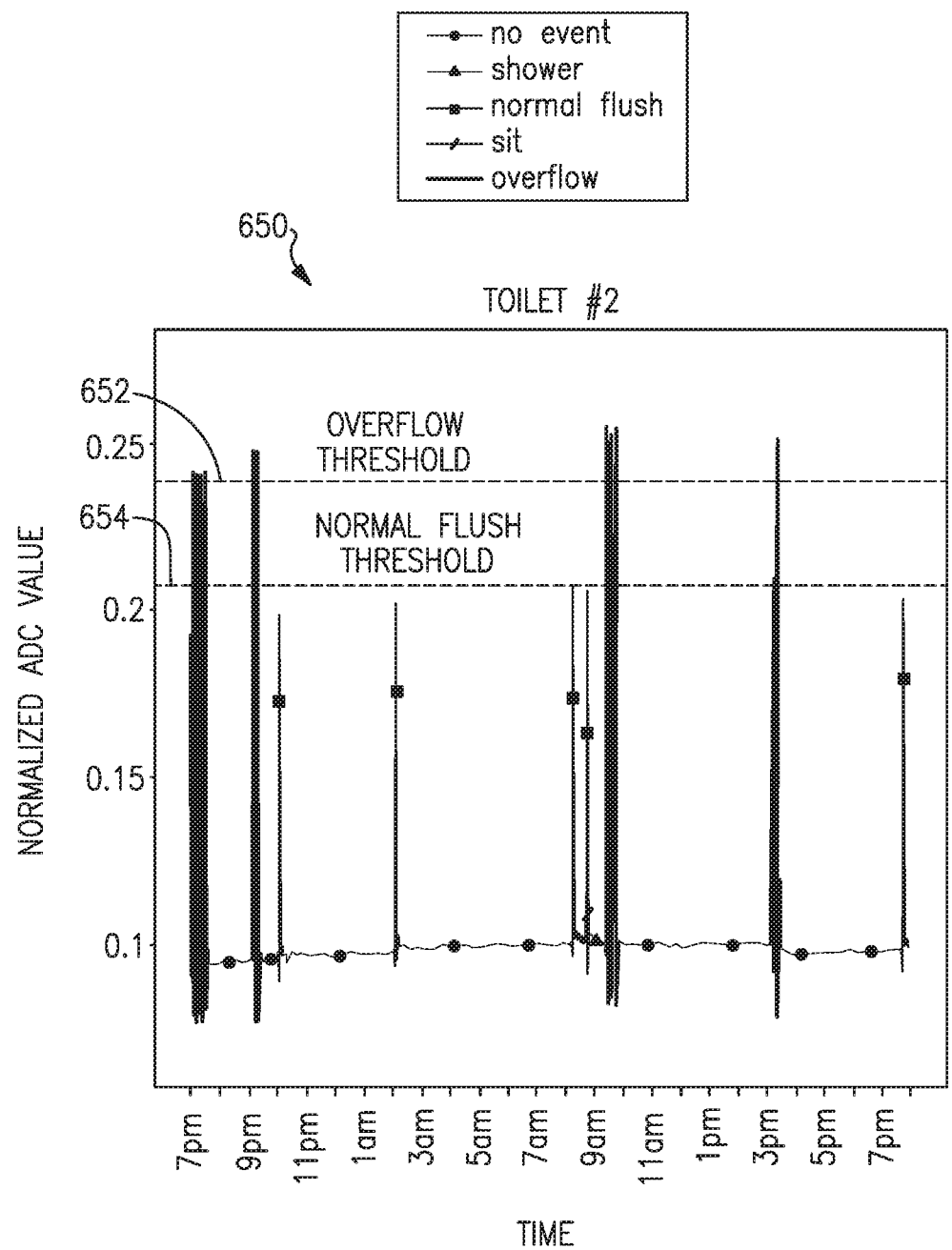

FIGS. 6A and 6B illustrate graphs 600, 650 for normal flush and overflow thresholds for a toilet overflow prevention system used in a first and second toilet design, respectively, according to some embodiments. The graphs 600, 650 illustrate that the thresholds can be different between different toilets. As described herein, the thresholds can differ as a result of the calibration process. The graphs 600, 650 illustrate overflow thresholds 602, 652 and normal flush thresholds 604, 654. The normal flush thresholds 604, 654 can be determined by taking an average peak of the voltage values for normal flushes during a calibration period, such as the normal flush thresholds described for FIGS. 4A-4B. In some embodiments, the toilet overflow prevention system can determine an overflow condition if the voltage is above the normal flush thresholds 604, 654 over a period of time.

As shown in the graphs 600, 650, an overflow threshold 602, 652 can be higher than a normal flush threshold 604, 654. The overflow threshold 602, 652 can be a predetermined amount or a percentage above the normal flush threshold 604, 654, such as the overflow thresholds described with respect to FIGS. 4A-4B.

The graphs 600, 650 illustrate five states: no event, a shower event, a normal flush, a user sits on the toilet event, and an overflow condition. As illustrated, during a normal event, a shower event, and a user sits on toilet event, the water level does not rise near the normal flush threshold. During a shower event, some systems can be affected by condensation formed on the conductive plates as steam builds up in confined spaces leading to bigger spikes in measured voltage. However, the toilet overflow prevention system was not affected by a shower event. During a normal flush, the water levels increase closer to the normal flush threshold 604, 654 and/or exceed the normal flush threshold 604, 654, but do not meet the overflow threshold 602, 652. During an overflow condition, the normalized voltage difference meets the overflow threshold 602, 652.

Implementation of a Toilet Overflow Prevention System

Figure 7:
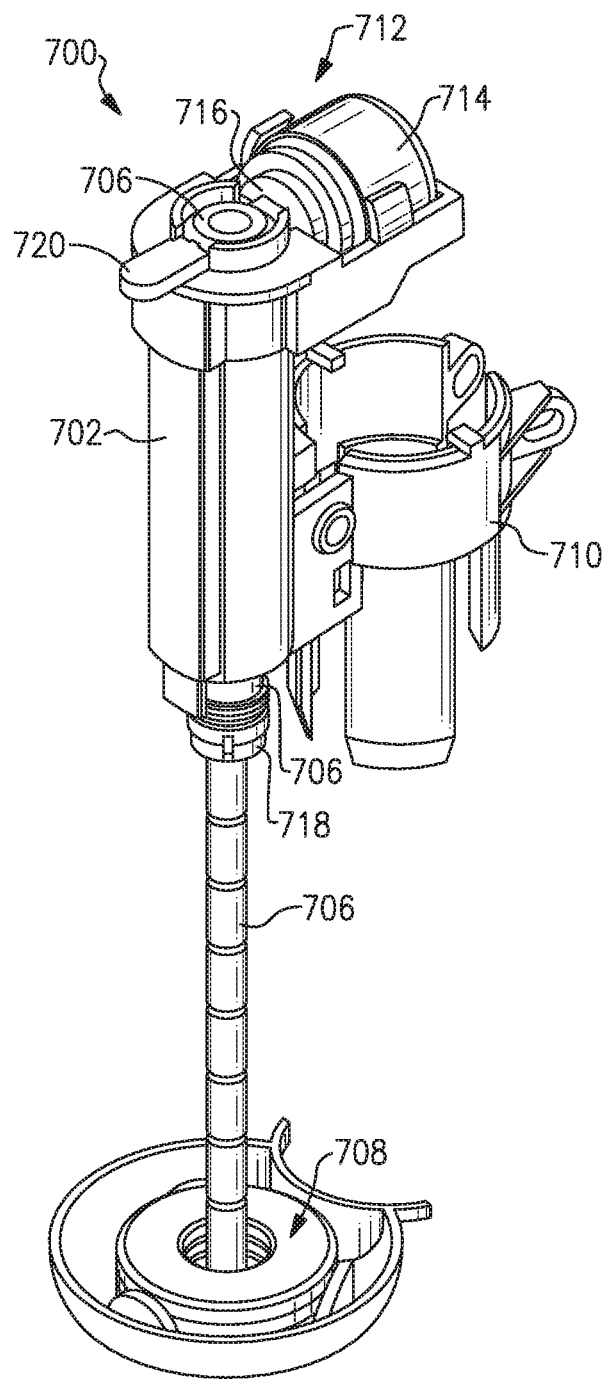
FIGS. 7 and 8 illustrate a tank valve closure device of a tank portion of the toilet overflow prevention system according to some embodiments.
Figure 8:
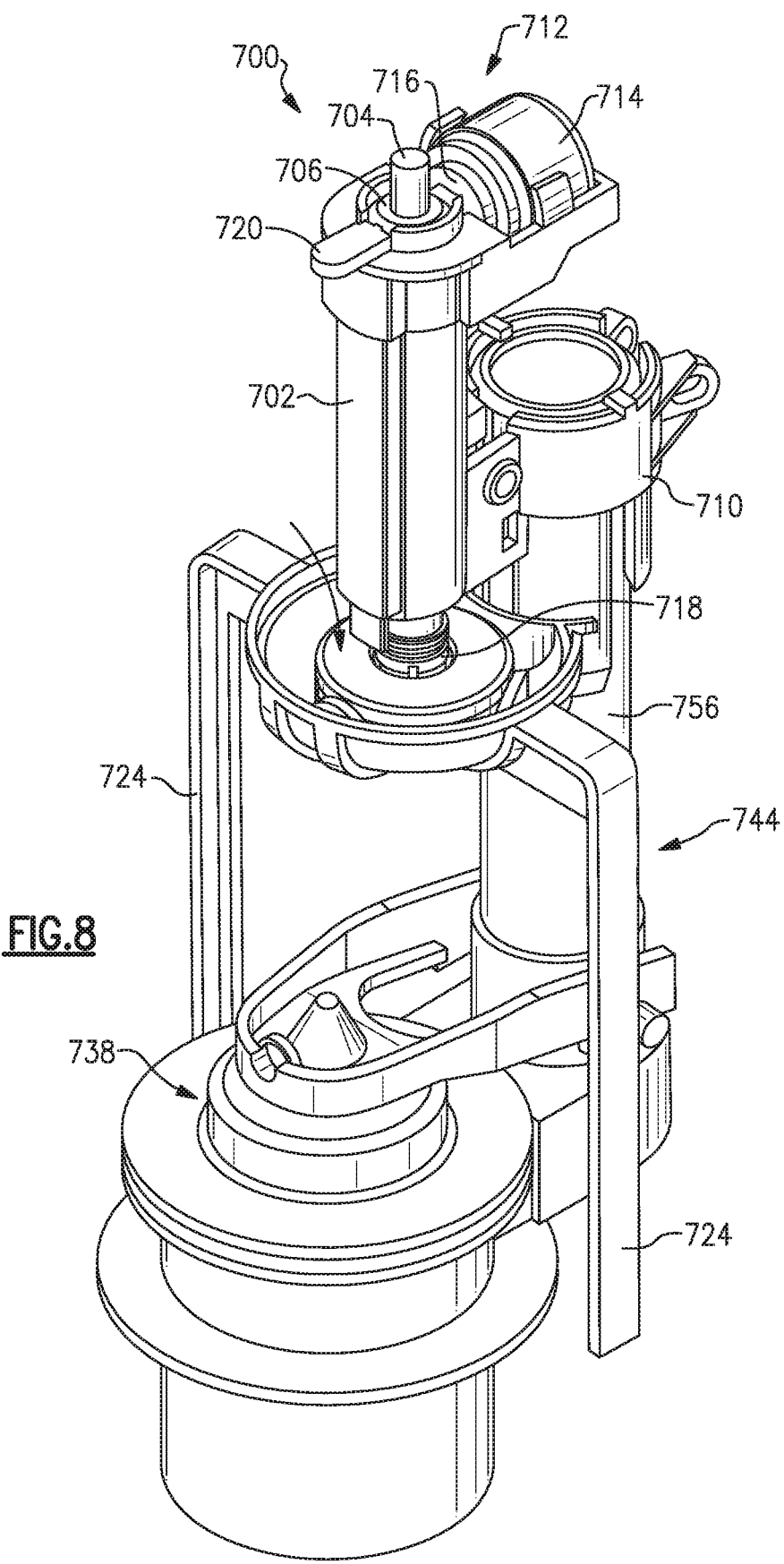

FIGS. 7 and 8 illustrate an example actuator 700 according to some embodiments. The actuator 700 can be or include the solenoid device 220 shown in and discussed in connection with FIG. 2. The actuator 700 is generally configured to be attachable to an overflow tube of a toilet, such as the overflow tube 756. As discussed in connection with FIG. 2, the actuator 700 preferably is capable of receiving a signal sent by the overflow detection portion 100. The actuator 700 is generally configured to forcibly close the flapper valve 738 so as to inhibit or entirely stop the flow of water through the passage from the tank to the toilet bowl. In the particular embodiment illustrated in FIG. 7 and FIG. 8, the actuator 700 is configured to push down the flapper valve 738 via a weight dropping mechanism, which is discussed in greater detail below.

The actuator 700 includes a main housing 702 that preferably is a generally tubular member that houses, at least in part, an inner hammer rod 704 and an outer hammer rod 706. The inner hammer rod 704 and the outer hammer rod 706 are configured to be axially movable within the main housing 702. The inner hammer rod 704 carries a hammer weight 708 that is attached to the lower end of the inner hammer rod 704. The main housing 702 also includes an overflow tube attachment structure 710 that allows the actuator 700 to be secured to the top of the overflow tube 756 so as to position the actuator 700 above the flapper valve 738.

With continued reference to FIG. 7, the upper portion of the main housing 702 preferably includes a solenoid assembly 712 that is configured to selectively restrain or release the outer hammer rod 706, which in turn restrains or releases the hammer weight 708. The solenoid assembly 712, in some embodiments, comprises a solenoid 714 that is connected to a solenoid latch 716 that defines a mechanical catch to hold or release the outer hammer rod 706. As discussed briefly above, the solenoid 714 can be actuated by a control signal that may be sent by the sensor or processor. The solenoid 714 may receive a control signal via a hardwired signal or a wireless signal, such as an RF signal, for example.

The actuator 700 preferably is configured to hold the hammer weight 708 in an elevated position relative to the flapper valve 738 such that the flapper valve 738 is free to move between its open and closed positions during normal flush cycles. In the illustrated embodiment, after the actuator 700 has received an appropriate control signal, the solenoid 714 activates the solenoid latch 716 to release the outer hammer rod 706. As a result, the outer hammer rod 706, and thus the hammer weight 708, are released and fall downward under their own weight to forcibly close the flapper valve 738. The detection, processing and release of the hammer rod 706 preferably occurs before the entire flush volume of water is evacuated from the tank.

The actuator 700 preferably is configured to have a predetermined amount of stroke for the outer hammer rod 706 relative to the main housing 702. That is, the outer hammer rod 706 generally determines the amount of movement that the hammer weight 708 will have based on the length of the outer hammer rod 706 and the length of the main housing 702. In some embodiments, it is preferable that the hammer weight 708 will be lowered to a sufficient height so as to securely close the flapper valve 738. In the illustrated embodiment, a certain amount of telescopic adjustability is provided between the inner hammer rod 704 and the outer hammer rod 706.

With continued reference to FIG. 7, the inner hammer rod 704 preferably is insertable into the outer hammer rod 706 and telescopically adjustable so as to adjust the height of the hammer weight 708 relative to the height of the overflow tube 756. The inner hammer rod 704 preferably is securable relative to the outer hammer rod 706 by a rod collar 718 that can be tightened to secure the inner hammer rod 704 in a desired position relative the outer hammer rod 706. Such an arrangement allows for adjustment to various toilet designs.

Also included in the actuator 700 is a reset latch 720 that is configured to be manually lifted to reset the actuator 700 after the hammer weight 708 has been released by the solenoid latch 716. As will be appreciated by one skilled in the art, in other embodiments, the actuator 700 can be configured to automatically reset after the hammer weight 708 has been released, thus negating the need for the reset latch 720.

With reference to FIG. 8, the actuator 700 is secured to the top of the overflow tube 756 via the overflow tube attachment structure 710, which is configured to be a snap-fit in the illustrated arrangement. Furthermore, the main housing 702 of the actuator 700 preferably is positioned such that the hammer weight 708 is located generally above the flapper valve 738 such that when the hammer weight 708 is released, it will drop on the top of the flapper valve 738 and forcibly close the flapper valve 738.

With continued reference to FIG. 8, the hammer weight 708 is shown being supported in a height set jig 722 which is configured to allow a user to set the height of the hammer weight 708 relative to the outer hammer rod 706 (and the flapper valve 738). After the actuator 700 has been installed on the overflow tube 756, a user preferably loosens the rod collar 718 thus allowing the inner hammer rod 704 to move axially relative to the outer hammer rod 706. At this time it is preferable that a user place the hammer weight onto the top of the height jig 722 wherein the legs 724 of the height jig 722 are resting on the bottom of the tank. At this time while the hammer weight 708 is being supported by the height jig 722, a user then preferably tightens the rod collar 718 to secure the inner hammer rod 704 relative to the outer hammer rod 706 thus setting the proper height of the hammer weight 708. Before the system is placed into use, the height jig 722 preferably is removed.

Although one particular embodiment of the actuator 700 has been illustrated with reference to FIG. 7 and FIG. 8, as will be appreciated by one skilled in the art, various other embodiments of actuators can be used to substantially reduce or eliminate water flow to the bowl in the event of a detected overflow flush condition. Such suitable alternative embodiments may comprise an actuator 700 that independently rests on the bottom of the tank and does not attach to the overflow tube 756. Other suitable embodiments may comprise an actuator that is attached to the upper rim of the tank. Another suitable embodiment may comprise a rotational solenoid attached to the flapper valve 738 such that a torsional force is applied to the pivoting arm of the flapper valve 738 so as to close the flapper valve in the event of an overflow flush condition. Another embodiment may not comprise an actuator located in the tank but may include an actuator that is attached a valve that controls water flow from the external water supply source for the toilet. Thus, the actuator 700 shown in FIG. 7 and FIG. 8 is simply one possible embodiment of an actuator that can be used with the toilet overflow prevention system.

Although the systems and methods have been disclosed in the context of certain preferred embodiments and examples, it will be understood by those skilled in the art that the present disclosure extends beyond the specifically disclosed embodiments to other alternative embodiments and/or uses of the systems and methods and obvious modifications and equivalents thereof. In addition, while the number of variations of the systems and methods have been shown and described in detail, other modifications, which are within the scope of this disclosure, will be readily apparent to those of skill in the art based upon this disclosure. It is also contemplated that various combinations or subcombinations of the specific features and aspects of the embodiments may be made and still fall within the scope of the disclosure. Accordingly, it should be understood that various features and aspects of the disclosed embodiments can be combined with, or substituted for, one another in order to perform varying modes of the disclosed systems and methods. Thus, it is intended that the scope of the present disclosure herein disclosed should not be limited by the particular disclosed embodiments described above, but should be determined only by a fair reading of the claims.

What is claimed is:

1. A toilet overflow prevention system for use with a toilet, comprising:
    a capacitance sensor arrangement configured to emit a signal indicative of a dielectric constant, said capacitance sensor arrangement including a first and second conductive plate, said first conductive plate is disposed above said second conductive plate, the capacitance sensor arrangement further configured to receive a first signal at a first time and a second signal at a second time, wherein at least one of said first and second conductive plates include a pivot point configured to enable a degree of rotation;
    one or more processors configured to:
        determine a duration of a normal flush cycle based on said first signal indicative of said dielectric constant;
        establish a first threshold associated with the first signal indicative of the duration of the normal flush cycle;
        determine an overflow flush condition based on said second signal and the first threshold; and
        generate a control signal in response to determining said overflow flush condition in order to close a valve that stops a flow of water within said toilet.

2. The toilet overflow prevention system of claim 1, further comprising:
    an actuator configured to receive said control signal and in response to said control signal, operate to close said valve that stops said flow of water within said toilet.

3. The toilet overflow prevention system of claim 1, wherein said valve includes a flapper valve.

4. The toilet overflow prevention system of claim 1, wherein said one or more processors compares a value of said second signal to said first threshold that is stored in a memory to make said determination of said overflow flush condition.

5. The toilet overflow prevention system of claim 4, wherein said one or more processors compares said second value to said first threshold over a period of time.

6. The toilet overflow prevention system of claim 5, wherein said period of time is sufficient to include an entire flush cycle.

7. The toilet overflow prevention system of claim 4, wherein said one or more processors makes said determination of said overflow flush condition in response to determining that said value is continuously outside of said normal range for a period of time.

8. The toilet overflow prevention system of claim 4, wherein said normal range is preprogrammed.

9. The toilet overflow prevention system of claim 4, wherein said normal range is determined through a calibration cycle, wherein said calibration cycle includes said one or more processors measuring a characteristic of one or more normal flushes, and determining a normal range above said characteristic.

10. The toilet overflow prevention system of claim 9, wherein said characteristic is an average peak of a water height during the one or more normal flushes, and wherein said normal range is above said average peak of said water height.

11. The toilet overflow prevention system of claim 1, further comprising a transmitter to transmit said control signal to a receiver in order to close said valve.

12. The toilet overflow prevention system of claim 1, wherein the capacitance sensor arrangement further includes a third conductive plate.

13. The toilet overflow prevention system of claim 1, wherein each of said first and second conductive plates include a pivot point configured to enable a degree of rotation.

14. A toilet overflow prevention system for use with a toilet, comprising:
 a capacitance sensor arrangement configured to emit a signal indicative of a dielectric constant, said capacitance sensor arrangement including a first and second conductive plate, said first conductive plate is disposed adjacent to said second conductive plate, the capacitance sensor arrangement further configured to receive a first signal at a first time and a second signal at a second time, wherein at least one of said first and second conductive plates include a pivot point configured to enable a degree of rotation;
 one or more processors configured to:
  determine a duration of a normal flush cycle based on said first signal indicative of said dielectric constant;
  establish a first threshold associated with the first signal indicative of the duration of the normal flush cycle;
  determine an overflow flush condition based on said second signal and the first threshold; and
  generate a control signal in response to determining said overflow flush condition in order to close a valve that stops a flow of water within said toilet.

15. The toilet overflow prevention system of claim 14, wherein said one or more processors compares a value of said second signal to said first threshold that is stored in a memory to make said determination of said overflow flush condition.

16. The toilet overflow prevention system of claim 14, wherein the capacitance sensor arrangement further includes a third conductive plate disposed adjacent to at least one of said first conductive plate or said second conductive plate.

17. A toilet overflow prevention system for use with a toilet, comprising:
 a capacitance sensor arrangement configured to emit a signal indicative of a dielectric constant, said capacitance sensor arrangement including a first and second conductive plate, said first conductive plate and said second conductive plate disposed adjacent to a processor housing, the capacitance sensor arrangement further configured to receive a first signal at a first time and a second signal at a second time, wherein at least one of said first and second conductive plates include a pivot point configured to enable a degree of rotation;
 wherein the processor housing houses one or more processors, the one or more processors configured to:
  determine a duration of a normal flush cycle based on said first signal indicative of said dielectric constant;
  establish a first threshold associated with the first signal indicative of the duration of the normal flush cycle;
  determine an overflow flush condition based on said second signal and the first threshold; and
  generate a control signal in response to determining said overflow flush condition in order to close a valve that stops a flow of water within said toilet.

18. The toilet overflow prevention system of claim 17, wherein said one or more processors compares a value of said second signal to said first threshold that is stored in a memory to make said determination of said overflow flush condition.

19. The toilet overflow prevention system of claim 17, wherein the capacitance sensor arrangement further includes a third conductive plate disposed adjacent to the processor housing.

* * * * *

UNITED STATES PATENT AND TRADEMARK OFFICE
CERTIFICATE OF CORRECTION

Page 1 of 1

PATENT NO. : 11,193,264 B2
APPLICATION NO. : 16/877125
DATED : December 7, 2021
INVENTOR(S) : Salemi Parizi et al.

It is certified that error appears in the above-identified patent and that said Letters Patent is hereby corrected as shown below:

On the Title Page

Column 1, Line 2, item (63) under Related U.S. Application Data, delete "2019," and insert --2018,--.

In the Drawings

On Sheet 11 of 11, FIG. 8, Line 8 (Approx.), below "702" insert --708--.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*